Patented Mar. 25, 1952

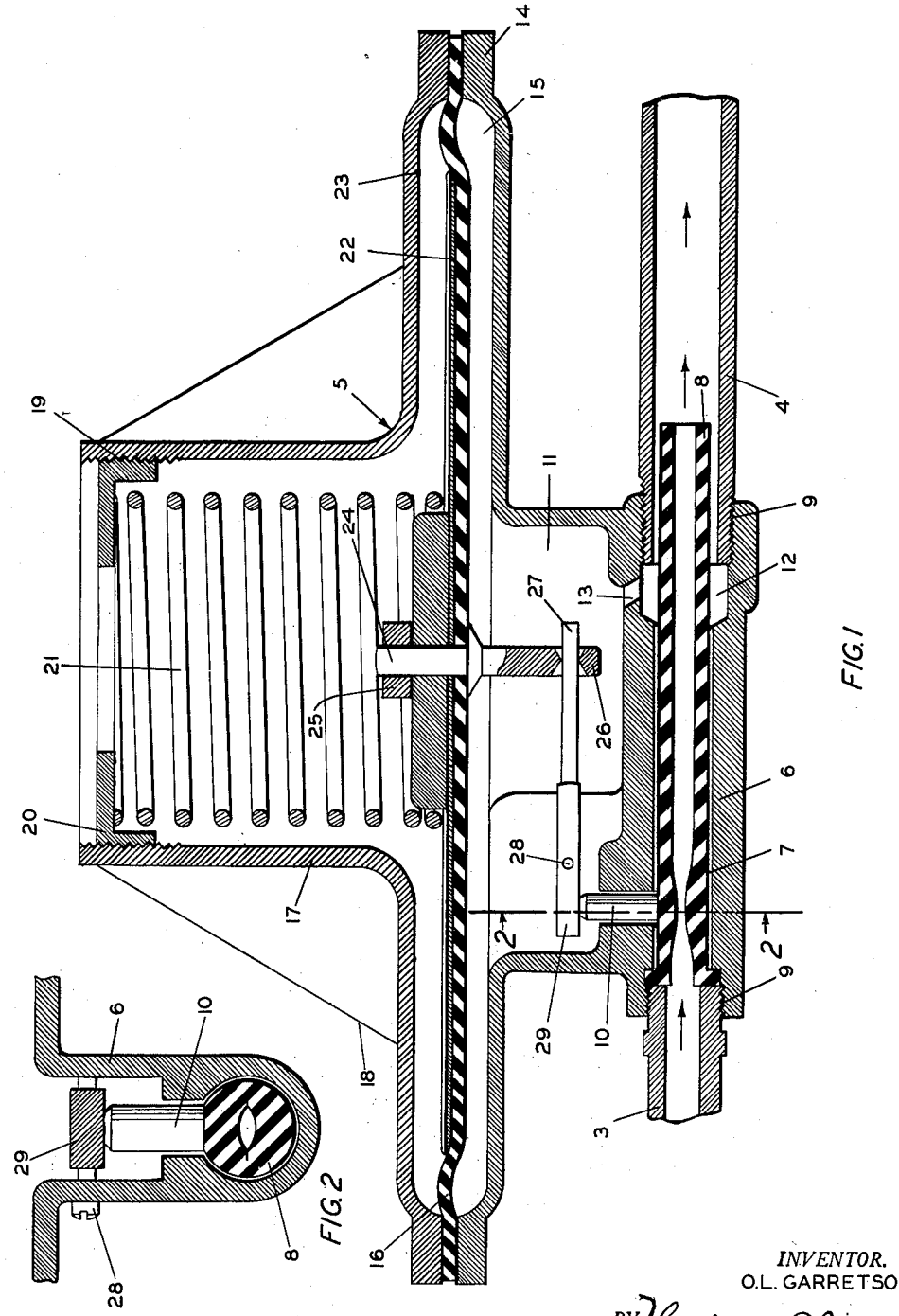

2,590,396

UNITED STATES PATENT OFFICE 2,590,396

REGULATOR

Owen L. Garretson, Bartlesville, Okla., assignor to Phillips Petroleum Company, a corporation of Delaware Application December 26, 1945, Serial No. 637,165

2 Claims. (Cl. 50—26)

This invention relates to regulators. In a more specific aspect it relates to regulators for fluids providing a constant pressure on the downstream side of the regulator. In another more specific aspect it relates to a regulator in which a gas or volatile liquid under relatively high pressure expands to a lower constant pressure. In this last aspect, if the gas or liquid contains water (which is hard to eliminate entirely) the present invention relates to the elimination of ice formed by the cooling effect due to pressure reduction and/or substantial prevention of the formation of such ice.

There is an urgent need for a reliable non-freezing regulator in the liquified gas industry. For example see "The Freezing of Regulators and Valves in Liquefied Petroleum Gas Systems" by W. C. Buttner in the Liquefied Petroleum Gas Association Inc., publication "JET," May, June, 1939. In that article it is stated that several types of "non-freezing" regulators were tested and without exception they all froze up under certain conditions. The tests revealed an accumulation of ice inside the nozzle next to the valve seat. The only suggestions given in this cited article are the addition of methyl alcohol or glycerin to the liquid gas which causes trouble with the burners of the gas stoves, or complete dehydration of the liquefied petroleum gas which is quite expensive and not commercially practicable.

A regulator of the conventional design frequently becomes restricted or has its flow completely stopped due to the collection of ice in the orifice which accumulates from the small quantity of water in solution in the liquid fuel. This water is collected as ice due to the fact that the low temperature created in the low pressure region of the regulator absorbs heat from the inlet section of the regulator and forms a cold surface in contact with the high pressure liquid fuel. This cold surface collects water of solution which in time becomes ice. The present invention prevents this by a combination of several design features. The liquid or high pressure gas is contained inside a flexible tube such as synthetic rubber until it is discharged at a point beyond the regulator. This tube has low heat conductivity qualities and therefore isolates the chilling action of the low temperature fluid so that the regulator body proper is not appreciably chilled by the discharge flow. The diaphragm is operated by vapor in a chamber which enters through a port, and due to the very slight flow of vapor in and out through the port no liquid reaches the diaphragm chamber. The variable restriction which controls the flow of liquid is located at a point near the upstream end of the flexible tube and is of a flexible nature so that in the event there is sufficient heat transfer longitudinally in the flexible tube to collect ice in the inlet section of this restriction, it will open wider and continue to allow flow. It has a further advantage of flexing sufficiently to break loose the ice formation and allow it to pass on through the regulator into the outlet where the ice will return to water vapor by sublimation or melting and evaporation. Flexible material such as synthetic rubber also is of such nature that ice will not adhere readily to its surface and does not form a tight bond such as is the case when ice collects on a metal surface. The push pin is either round or non-circular in cross section and it could also consist of a short stiff spring so that in the event the outlet pressure on the regulator increased appreciably above its normal discharge setting the force on the flexible tube would not become excessive before the diaphragm was stopped by the back-up plate contacting the upper diaphragm cover.

One object of this invention is to provide a regulator.

Another object is to provide a non-freezing regulator.

Another object is to provide a regulator for liquid or high pressure gas which will allow the expansion of said liquid or gas to a relatively constant pressure with no formation of ice from moisture therein, or reduced formation of ice and elimination of ice.

Another object is to provide a diaphragm type regulator having a flexible tube valve as shown in the drawings.

Numerous other objects and advantages will be apparent to those skilled in the art upon reading the accompanying specifications, claims and drawings.

In the drawings:

Figure 1 is an elevational view of a cross section taken through a regulator embodying the present invention.

Figure 2 is a cross sectional view of a portion of Figure 1 taken along the line 2—2 looking into the direction indicated by the arrows.

In Figure 1, a tube 3 supplies a hydrocarbon, or other gas, which may contain small quantities of water therein. This hydrocarbon, or other gas, hereinafter called fluid may be under such conditions of temperature and pressure as to be a liquid, or it may be a gas of relatively high pressure. It is desirable to reduce the pressure of this fluid to a lower pressure in pipe 4 suitable for use in gas stoves or other appliances. Obviously the reduction of pressure may be done in several stages in which case the structure of Figure 1 could be duplicated downstream in pipe 4. Other regulators old in the art may be employed for the other stages if the present regulator provides the pressure reduction most likely to cause freezing. However, the pressure reduction may occur in one stage in which case only one regulator, as shown in Figure 1, is used.

The reduction of pressure from pipe 3 to that in pipe 4 results in considerable cooling which cooling may cause a formation of ice. As explained above, it is desired to have a regulator between pipes 3 and 4 which will prevent the formation of ice, or if the ice forms, which will eliminate the ice or operate in spite of the ice.

In order to provide such a regulator generally designated as 5, a body 6 may be provided having a bore 7 with suitable connections 9, 9 to pipes 3 and 4. In bore 7 is provided a tube 8 made of flexible material, preferably a synthetic rubber to which ice will not adhere readily, and which synthetic rubber is resistant to deterioration by the gas, especially if the gas is a hydrocarbon gas.

The high pressure liquid or gas in 3 expands through tube 8 into 4, and in order to regulate such expansion, tube 8 may be more or less pinched closed by a push pin 10. The body 6 is provided with an upper chamber 11 communicating with space 12 through opening 13, opening 13 being relatively small to reduce the passage of gas therethrough. The upper part of 6 is expanded into flange 14 forming a lower diaphragm chamber 15. Secured to flange 14 by any suitable means is a flexible diaphragm 16 made of any suitable material such as synthetic rubber, or cloth impregnated with synthetic rubber. Such diaphragms are conventional.

Secured to flange 14, by any suitable means, is a cover-cap 17 which may have reinforcing ribs 18 and which may be threaded at 19 if desired, to receive adjustable sleeve 20 which sleeve 20 may be screwed in or out of 17 to adjust the force of spring 21 on the top of diaphragm 16.

Spring 21 presses on a metal backup plate 22. Backup plate 22 contacts cover 17 at a position 23 limiting upward movement of diaphragm 16 and preventing rupture of diaphragm 16 if the pressure in 11 rises unduly.

Plate 22 and diaphragm 16 are secured together by bolt 24 and nut 25. Bolt 24 has a hole 26 in its lower end which operates the end of lever 27. Lever 27 is pivoted to body 6 at pivot 28 and the other end 29 of lever 27 operates push-pin 10 up and down.

In some instances, push-pin 10 may be a helical coil compression spring which is short and stiff so that in the event the pressure in 11 increases unduly there can be some yielding in pin 10 to reduce any cutting action on flexible tube 8.

The synthetic rubber employed in tube 8 is preferably "Hycar OR" or other low temperature resisting rubber. As shown in Figure 2, lever 29 pivots around pivot 28 to push the pin 10 down against tube 8 in body 6.

*Operation*

Starting with a high pressure gas in 3 and a certain setting of spring 21, the pressure in pipe 4 transmitted through opening 13 is balanced in chamber 11 against diaphragm 16 and spring 21.

Diaphragm 16 moves downwardly rocking lever 27 about pivot 28 allowing push-pin 10 to rise and tube 8 to open until sufficient pressure exists in 4, 13 and 11 to move diaphragm 16 upwardly forcing push-pin 10 down and closing or nearly closing tube 8.

In passing from 3 to 4 the liquid or gas in 3 expands into a less dense gas in 4. This expansion extracts heat from surrounding objects and may cause freezing of water if water is present.

While the present invention does not depend on any theory of operation, the following theory is advanced merely for purposes of explanation. The invention is not to be limited by the following theory, and the following theory may prove false without effecting the validity or scope of the invention. In theory the shape of the orifice 8 is important as well as the material from which 8 is made. Freezing always begins at the upstream end of an orifice, because a little cooling there at a point where the fluid is under high pressure causing moisture to drop out much more readily than does the same amount of cooling of a relatively low pressure gas. The cooling effect, however, results from expansion of the gas after it has passed through the up-stream portion of the orifice. The problem then is to prevent the cooling effect from lower portions of orifice 8 from reaching the up-stream end of the orifice by making the orifice of substantially uniform cross section, of sufficient length, and of sufficient resistance to thermal conductivity, so that heat may be supplied to the up-stream end of the orifice rapidly enough to prevent freezing. This heat may be supplied by the fluid in 3 and by conduction through body 6.

Further advantages of flexible tube 8 are that ice will not adhere to the tube as it would to a rough metal part. The tube may expand slightly and allow ice to be blown through the tube 8 into tube 4 where the ice will return to water vapor, and the automatic rise and fall of push-pin 10 will have a small beneficial action on removing any ice from tube 8.

Obviously formal changes may be made in the specific embodiment of the invention described without departing from the spirit and the substance of the present invention, the scope of which is commensurate with the appended claims.

Having described my invention, I claim:

1. A regulator in which freezing is inhibited, comprising in combination a metal, heat conducting body having a conduit therein, said conduit having an upstream inlet end adapted to be connected to a supply of fluid under pressure, and a downstream outlet end adapted to be connected to a dispensing pipe, said conduit comprising in part an orifice member made entirely and solely of a flexible resilient heat insulating tube which is axially longer than its external diameter, whereby heat travels slowly from the upstream to the downstream end of said member, the remainder of said conduit being of greater internal diameter than the internal diameter of said orifice member, means securing the upstream end of said orifice member sealed to the walls of said conduit so the entire flow in said conduit passes through said orifice member, the remaining major portion of said orifice member being loose in said conduit, said heat conducting body contacting at least the upstream half of said orifice member, whereby heat is supplied thereto more readily than said heat travels to the downstream end of said member, the walls of said body throughout said contact being thicker than the wall of said orifice member in order to furnish a reservoir of heat therefor, at least the downstream third of said orifice member being out of contact with the walls of said conduit whereby cooling at the downstream end of said member is not in contact with said body and room for expansion of said downstream end is provided so that ice formed therein will blow out upon such expansion, and means to constrict and release said orifice member at a point adjacent the upstream end of said member biased to release said member and responsive to pressure in said conduit downstream of said orifice to constrict said member whereby the pressure of said outlet end is regulated.

2. A regulator in which freezing is inhibited, comprising in combination a metal, heat conducting body having a conduit therein, said conduit having an upstream inlet end adapted to be connected to a supply of fluid under pressure, and a downstream outlet end adapted to be connected to a dispensing pipe, said conduit comprising in part an orifice member made entirely and solely of a flexible resilient heat insulating tube which is axially longer than its external diameter, whereby heat travels slowly from the upstream to the downstream end of said member, the remainder of said conduit being of greater internal diameter than the internal diameter of said orifice member, means securing the upstream end of said orifice member sealed to the walls of said conduit so the entire flow in said conduit passes through said orifice member, the remaining major portion of said orifice member being loose in said conduit, said heat conducting body contacting at least the upstream half of said orifice member, whereby heat is supplied thereto more readily than said heat travels to the downstream end of said member, the walls of said body throughout said contact being thicker than the wall of said orifice member in order to furnish a reservoir of heat therefor, at least the downstream third of said orifice member being out of contact with the walls of said conduit whereby cooling at the downstream end of said member is not in contact with said body and room for expansion of said downstream end is provided so that ice formed therein will blow out upon such expansion, and means to constrict and release said orifice member at a point adjacent the upstream end of said member biased to release said member and responsive to pressure in said conduit downstream of said orifice to constrict said member whereby the pressure of said outlet end is regulated, comprising a chamber communicating with said conduit downstream of said orifice, a diaphragm forming a wall of said chamber, a spring biasing said diaphragm to reduce the volume of said chamber, a lever pivoted to said body, means connecting a portion of said lever to said diaphragm, and a pin movably mounted in said body disposed in contact with said lever and with said orifice member at said point adjacent the upstream end of said member.

OWEN L. GARRETSON.

REFERENCES CITED

The following references are of record in the file of this patent:

UNITED STATES PATENTS

| Number | Name | Date |
|---|---|---|
| Re. 21,597 | Niesemann | Oct. 8, 1940 |
| 726,962 | Metzger | May 5, 1903 |
| 1,120,002 | Walquist | Dec. 8, 1914 |
| 2,302,175 | Bowen | Nov. 17, 1942 |
| 2,405,371 | Salmonsen | Aug. 6, 1946 |

FOREIGN PATENTS

| Number | Country | Date |
|---|---|---|
| 208,807 | Switzerland | 1940 |